United States Patent
Dyett et al.

[11] Patent Number: 5,560,515
[45] Date of Patent: Oct. 1, 1996

[54] CIGARETTE WEIGHT CONTROL

[75] Inventors: Derek H. Dyett; Robert E. Williams, both of High Wycombe, Great Britain

[73] Assignee: Molins PLC, Milton Keynes, England

[21] Appl. No.: 387,557

[22] Filed: Feb. 13, 1995

[30] Foreign Application Priority Data

Mar. 4, 1994 [GB] United Kingdom ............... 9404174
Jun. 29, 1994 [GB] United Kingdom ............... 9413038

[51] Int. Cl.⁶ ................................... G07F 11/72
[52] U.S. Cl. ................. 221/135; 221/211; 221/222; 221/290; 221/295; 221/296; 177/145
[58] Field of Search ............... 221/211, 135, 221/222, 2, 7, 8, 13, 15, 16, 151, 152, 153, 290, 295, 296; 177/145

[56] References Cited

U.S. PATENT DOCUMENTS

| | | | |
|---|---|---|---|
| 2,102,317 | 12/1937 | Gwinn | 177/145 |
| 2,601,786 | 7/1952 | Best | 221/211 X |
| 2,707,630 | 5/1955 | Molins | 177/145 X |

FOREIGN PATENT DOCUMENTS

| | | |
|---|---|---|
| 769232 | 8/1934 | France . |
| 327098 | 3/1930 | United Kingdom . |
| 392102 | 5/1933 | United Kingdom . |
| 421551 | 12/1934 | United Kingdom . |
| 528014 | 10/1940 | United Kingdom . |
| 375463 | 6/1992 | United Kingdom . |

Primary Examiner—William E. Terrell
Assistant Examiner—Dean A. Reichard
Attorney, Agent, or Firm—Antonelli, Terry, Stout & Kraus

[57] ABSTRACT

Apparatus for regularly weighing groups of cigarettes comprises a suction drum arrangement (4,6) for picking up a predetermined number of cigarettes from a multi-layer flow of cigarettes (2) on a conveyor (3) and for feeding the cigarettes as a row (25) onto a ramp (14) connected to a weighing device (18), and including an arm (20) for arresting the cigarettes on the ramp until weighing has been accomplished, whereupon the arm is arranged to release the cigarettes to allow them to slide or roll down the ramp and back onto the flow of cigarettes on the conveyor (3).

6 Claims, 1 Drawing Sheet

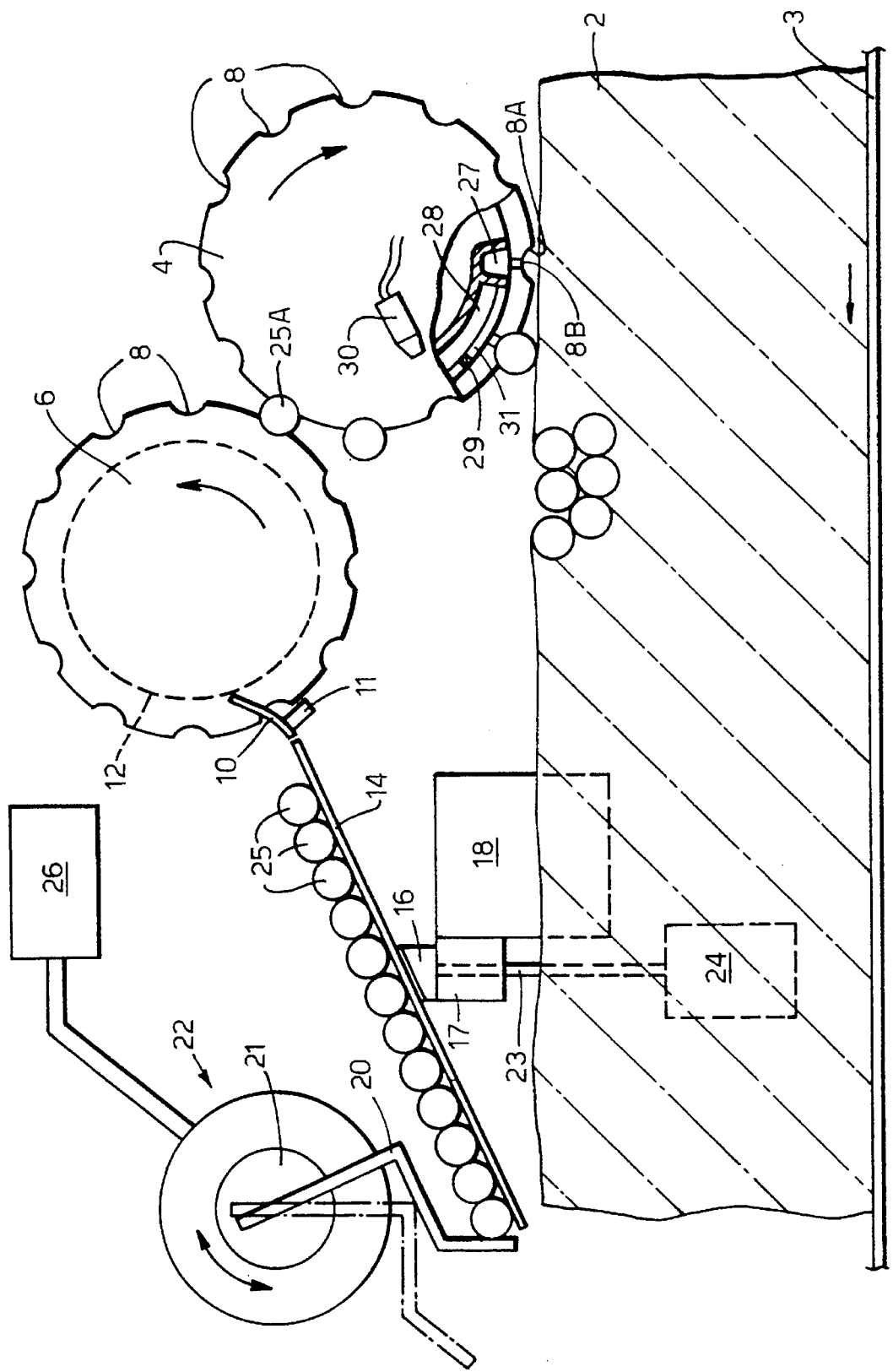

CIGARETTE WEIGHT CONTROL

BACKGROUND OF THE INVENTION

It is important to monitor and continuously control the weights of cigarettes made by a cigarette making machine. Commonly that is done by means of a nucleonic device which scans the finished cigarettes and produces an output signal which is used to control a trimming device removing a variable quantity of the tobacco forming the cigarette filler stream before it is wrapped in a paper web to form a continuous cigarette rod.

Nucleonic devices can emit potentially harmful X-rays and there is accordingly a need for investigating other devices. Other means for continuously scanning the cigarette rod or the unwrapped filler stream have been proposed. However, some such devices may be insufficient on their own to control the weights of finished cigarettes, and we believe there is a need for a device for intermittently weighing groups of cigarettes produced by a cigarette making machine in order to use the actual cigarette weight as a means of checking or calibrating the continuous rod or filler stream scanner. The present invention is concerned with such a weighing device.

SUMMARY OF THE INVENTION

According to the present invention, apparatus for regularly weighing groups of cigarettes comprises means for picking up a predetermined number of cigarettes from a flow of cigarettes on a cigarette conveyor (particularly a multi-layer stack flow) and for feeding the cigarettes as a row onto a ramp connected to a weighing device, and including means for arresting the cigarettes on the ramp until weighing has been accomplished, whereupon the arresting means is arranged to release the cigarettes to allow them to slide or roll down the ramp and back onto the flow of cigarettes on the conveyor.

The means for picking up cigarettes from the flow preferably comprises a fluted drum which picks up and carries the cigarettes by means of suction applied at the flutes, and there is preferably a second fluted drum which receives the cigarettes from the first drum and from which the cigarettes are, removed by a fixed stripper and then slide onto the ramp. In order to produce each group of cigarettes for weighing, for example twelve cigarettes, the drums are driven until a counting device detects that the required number of cigarettes have either been picked up by the drums or have been delivered onto the ramp. In the former case, the counting device may, for example, comprise a suction pressure sensing device in the first drum which detects a change in the suction pressure in a suction passage whenever the end of the passage is closed by a cigarette. Alternatively, use may be made of an optical or other cigarette detecting device which can feed signals to an electronic counter arranged to stop the drums or to stop the picking up of additional cigarettes (the drums being possibly continuously driven) when the required number of cigarettes has been picked up from the cigarette flow or delivered to the ramp.

BRIEF DESCRIPTION OF THE DRAWINGS

An example of a cigarette weighing device according to the invention is shown in the accompanying drawing which is a diagrammatic partly sectioned front view of the device.

DESCRIPTION OF THE PREFERRED

As shown in the drawing, a mass flow 2 of cigarettes is carried by a conveyor 3 from the right to the left as seen in the drawing. Mounted above the cigarette flow are two fluted suction drums 4 and 6 formed with relatively shallow parallel flutes 8 which are at the same intervals on both the drums. Cigarettes are picked up from the flow on the conveyor 3 by the drum 4 and are then transferred to the drum 6, from which they are removed by a fixed stripping member 10 which extends into a circumferential groove 12 in the drum 6; the member 10 is mounted on a fixed part 11. The drums 4 and 6 are driven continuously, each having a peripheral speed equal 1:o that of the conveyor 3.

Cigarettes removed from the drum 6 by the stripping member 10 roll onto a ramp 14 formed by two parallel lengths of wire mounted on a bracket 16 which extends rearwards and is secured to a weighing platform 17 of a load cell (weighing device) 18 mounted behind the cigarette flow stream.

Cigarettes delivered onto the ramp 14 are initially arrested by the lower end of an arm 20 mounted on the rotationally movable part 21 of an actuator 22. When the arm 20 is moved to the position shown in chain dotted outline,, it allows the cigarettes to roll down the ramp 14 and back onto the conveyor 3.

The bracket 16 extends rearwards beyond the platform 17 and carries a rod 23 which extends into and forms part of an oil-filled dashpot 24 which damps any machined-induced vibrations to limit the extent to which they are transmitted to the load cell 18.

As shown by the drawing, the device is arranged to measure twelve cigarettes 25 at a time. The load cell 18 is capable of weighing accurately the, twelve cigarettes as well as the bracket 16 and ramp 14. For example, the total weight of all those items may amount to no more than 50 gms. It should be noted that the lower end of the stripping device 10 is slightly spaced from the upper end of the ramp 14 so as not to interfere with the weighing operation.

As soon as the load cell has indicated the weight to a controller 26, the controller transmits a signal to the actuator 22 to cause the arm 20 to rotate to the chain-dotted position so as to release the cigarettes from the ramp 14. As soon as all twelve cigarettes have left the ramp (or after a predetermined interval of time as may be required), another twelve cigarettes are picked up by the drum 4 and are delivered onto the ramp.

This cycle continues while the cigarette making machine is in operation. Each weighing results in the transmission of a weight signal from the load cell to the controller 26 (via connecting leads which are not shown) corresponding to that of the twelve cigarettes, the bracket 16 and parts mounted, and this weight signal (minus the fixed known weight of the bracket 16 and parts carried by it) may be used to confirm the correct operation of a continuous rod or filler stream scanner, or to re-calibrate the scanner either automatically or under the control of an operator.

The drawing shows the weighing system at a stage at which the twelve cigarettes on the ramp 14 have been weighed and are about to be released to return to the cigarette flow on the conveyor 3. As soon as that happens (or possibly shortly before or after that happens), the drum 4 starts to pick up the next group of cigarettes as a result of suction being transmitted to a pick-up manifold 27 by a solenoid-controlled valve (not shown) controlled by the controller 26. In the example shown, the drum 4 has already picked up three cigarettes of the twelve to form the next group of twelve (one flute having failed to pick up a cigarette, as can happen) and is about to transfer one cigarette 25A to the drum 6; another cigarette is about to be picked up by a flute 8A adjacent to the manifold 27 via a row of suction ports 8B.

A cigarette detector 30 (of known construction) adjacent to or in the drum 4 will detect the passage of the next nine cigarettes past it and will then (via the controller 26) cause the solenoid valve to shut off the supply of suction to the manifold 27; a separate suction manifold 28 is supplied continuously with suction to hold cigarettes on the drum 4 until the point at which any cigarette on the drum 4 must transfer to the drum 6, and suction is likewise applied continuously to the drum 6 to hold any cigarettes on the drum 6 up to the position of the stripping member 10.

A problem can arise from the fact that the fluted drum 4 sometimes picks up two or even three cigarettes at the same time. This is because suction transmitted through the suction ports 8B for each flute can hold two (or even three) closely spaced cigarettes neither of which actually sits in the flute itself. The result of picking up a pair of cigarettes instead of one, for example, is that the pair cannot transfer reliably to successive flutes in the drum 6, and there is also no certainty that a pair of cigarettes will remain on the drum 4 all the way to the transfer point.

A solution to this problem, we have found, involves briefly interrupting the supply of suction to the suction pods 8B of the flutes in the drum 4. This is achieved by a small bridge 29 across a slot 31 through which suction is transmitted from the manifold to the ports 8B of successive flutes. Residual suction is sufficient to hold a single cigarette in its flute, but a pair of cigarettes falls from the drum as the suction force holding them to the drum is temporarily lost. For this purpose the position of the counter 30 is such as to allow double cigarettes to be dropped off before they arrive at the counter; however, positioning the counter in this way means that a single cigarette can be picked up by the drum 4 and be on its way to the counter when the counter reaches a count of 12 cigarettes. Whenever that happens, the actual number of cigarettes counted and weighed is 13. That is not a problem since the controller 26 can, in response to a weight signal which clearly represents 13 cigarettes, instead of 12, determine the average cigarette weight by dividing by 13, instead of by 12.

The average cigarette weight value determined in this way can be use to check or calibrate a continuous cigarette rod or filler stream scanner, or simply to display the average cigarette weight value on a monitor for the, information of the machine operator.

We claim:

1. Apparatus for regularly weighing groups of cigarettes comprising means for picking up a predetermined plurality of cigarettes from a multi-layer flow of cigarettes on a conveyor and for feeding the cigarettes as a single substantially straight row onto a ramp connected to a weighing device, and including means for arresting the row of cigarettes on the ramp until weighing has been accomplished, whereupon the arresting means is arranged to release the cigarettes to allow them to slide or roll down the ramp and back onto the flow of cigarettes on the conveyor.

2. Apparatus according to claim 1, in which the means for picking up the cigarettes from the conveyor comprises a fluted drum.

3. Apparatus for regularly weighing groups of cigarettes comprising means for picking up a predetermined number of cigarettes from a flow of cigarettes on a conveyor and for feeding the cigarettes as a row onto a ramp connected to a weighing device, and including means for arresting the cigarettes on the ramp until weighing has been accomplished, whereupon the arresting means is arranged to release the cigarettes to allow them to slide or roll down the ramp and back onto the flow of cigarettes on the conveyor, the fluted drum being arranged to carry the cigarettes generally upwards and then to transfer them to a second fluted drum which carries the cigarettes further upwards and then downwards to a position at which the cigarettes are removed from the second fluted drum by a fixed stripping member and then pass onto the ramp.

4. Apparatus according to claim 3, including a cigarette detector adjacent to or in the first fluted drum for counting the cigarettes.

5. Apparatus according to claim 4 in which the cigarettes are arranged to be held on the first fluted drum by suction, and including means for briefly interrupting the supply of suction to allow any multi-cigarette collection to drop off the, drum upstream of the cigarette detector.

6. Apparatus according to claim 1, in which the means for arresting the row of cigarettes on the ramp, while they are being weighed comprises an arm of an actuator mounted separately from the weighing device and ramp.

* * * * *